United States Patent

[11] 3,581,101

| [72] | Inventor | Teodorico Neeff<br>38 Via Gran Sasso 20141, Milan, Italy |
|---|---|---|
| [21] | Appl. No. | 838,208 |
| [22] | Filed | July 1, 1969 |
| [45] | Patented | May 25, 1971 |
| [32] | Priority | July 13, 1968 |
| [33] | | Italy |
| [31] | | 18930A/68 |

[54] PHOTOELECTRIC BUBBLE METER FOR CHECKING GAS-TIGHT CONTAINERS AND THE LIKE
2 Claims, 1 Drawing Fig.

[52] U.S. Cl.............................................. 250/218,
73/52, 356/198
[51] Int. Cl............................................... G01h 21/26
[50] Field of Search............................................ 356/196-
—198; 250/218; 73/52

[56] References Cited
UNITED STATES PATENTS

| 2,333,791 | 11/1943 | Hutchison, Jr. .............. | 250/218(X) |
| 2,961,869 | 11/1960 | Bagno ......................... | 73/52(X) |
| 3,251,218 | 5/1966 | Russell ........................ | 73/52 |

*Primary Examiner*—Walter Stolwein
*Attorney*—Browdy and Neimark

ABSTRACT: The disclosure relates to a device for checking the gastightness of containers and the like. The device essentially comprises: a transparent jar containing a liquid and provided with an inflow tube dipping in said liquid and an outflow tube terminating above the surface of the liquid, said inflow tube being directly or intermediately with the container to be tested; a projector outside the transparent jar adapted to transmit a horizontal beam towards the end of the dipping tube; a photocell diametrically opposed to the projector and adapted to reveal the eventual bubbles originated by leaks in the tested container and issuing from the dipping tube; and an impulse counting device adapted to count the bubbles revealed by the photocell.

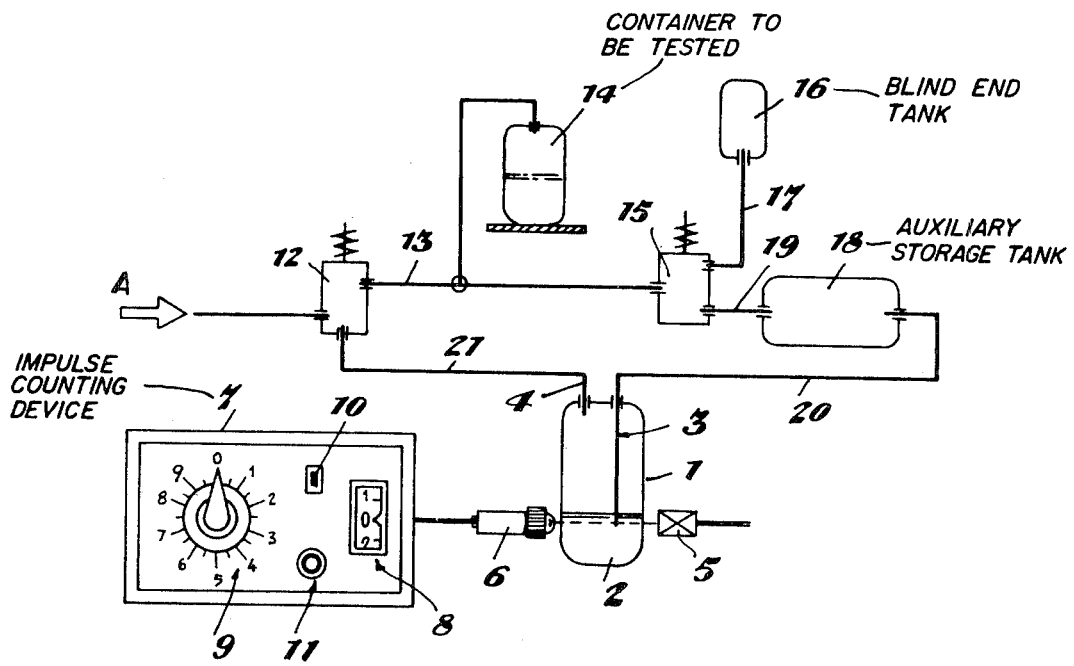

PHOTOELECTRIC BUBBLE METER FOR CHECKING GAS-TIGHT CONTAINERS AND THE LIKE

BACKGROUND OF THE INVENTION

This invention refers to a photoelectric bubble meter for checking the gastightness of containers and interception devices (taps, valves, etc.).

Numberless methods for checking on the gastightness of containers and the like exist on the market:

a. jars with central visual observation tubes of the passage of bubbles;
b. Bourdon-type manometers with indications of the fall in pressure;
c. bellows or diaphragm differential systems with an amplifying unit;
d. systems employing special gases (freon, hydrogen and others) and revealers of these gases.

To each advantage of the above-mentioned examples there is a corresponding disadvantage; they lack, in fact, in precision or else they are too complicated and delicate or they do not have an automatic indicating system.

SUMMARY OF THE INVENTION

The main object of the present invention is to eliminate the aforementioned difficulties providing a device in the form of a photoelectric bubble meter whose advantages are:

a. simplicity of construction, ease of checking and setting up;
b. the possibility of counting the bubbles by way of electrical apparatus;
c. variable precision at will according to the demands of the test;
d. the possibility of checking by a differential system and by a direct system (verification of the fall in pressure in a definite period of time, or the verification of the microflow caused by the loss);
e. the possibility of indicating losses by volume of up to 10 dm.$^3$ even with very high trial pressures.

These and other objects and advantages are achieved according to the invention by means of a photoelectric meter which essentially consists of: a jar made of glass or the like containing a liquid, preferably distilled water, having an inflow tube dipping below the level of the water in the jar, and an outflow tube above the liquid; a projector arranged to one side of the jar, outside same, and which projects a horizontal ray of light towards the lower end of the tube dipping into the jar; a photocell placed on the other side of the jar, diametrically opposite the projector and able to observe the air or gas bubbles issuing from the tube dipping into the jar, and an impulse counting device, preferably predisposed, to count the impulses coming from the photocell following the emission of the bubbles from the dipping tube, said tube being connected directly to the container or interception device of which the airtightness or the microflow of loss is to be tested. According to a further preferred development of the invention said meter is connected to a differential pressure system, including two electrovalves and a buffer tank for the checking of airtight containers or the like with bubble counting.

DESCRIPTION OF THE PREFERRED EMBODIMENTS

These and other aspects of the invention will be more clearly explained by the following description of its embodiment, given as an example and nonlimiting to the invention, with reference to the sole figure of the attached drawing which represents a diagram of this meter, with a differential pressure system.

Indicated in the figure by 1 is the glass jar containing distilled water 2; into the top of the jar protrudes a tube 3 which dips just below the level of the water 2 and introduces bubbles. A second outflow tube 4 goes out of the top of the jar 1. At one side of the jar 1 a projector 5 is placed sending a ray of light horizontally in the direction of the outflow end of the tube 3 issuing bubbles, said ray being received by a photocell 6 situated on the other side of the jar diametrically opposite the projector 5. The impulses of the photocell 6 are transmitted to an apparatus 7 including a preregulated impulse meter 8, which counts the impulses, or rather the bubbles issuing from tube 3, a preregulating commutator 9, a normal pushbutton 10 as well as a warning light 11 to verify correct operation.

In the developed preferred embodiment, this meter is connected to a differential pressure system comprising: an electrovalve 12 for the introduction of compressed air at A; a tube 13 connecting up to a container 14 to be tested and to a second electrovalve 15, a blind-end tank 16 to eliminate the capillary effect in tube 3 issuing bubbles, said tank being connected to the second electrovalve 15 by a tube 17; an auxiliary storage tank 18 for the differential system, connected to the second electrovalve 15 by a tube 19 and to the tube 3 issuing bubbles by a further tube 20; and finally a tube 21 connecting up the outflow tube 4 from the jar 1 to the first electrovalve 12. In the case of checking a gastight container 14, this meter operated as follows: air is introduced (in A) into the system at the required pressure through the electrovalve 12 which is open, electrovalve 15 being open also. The compressed air thus enters the whole system including the container to be tested 14 and the jar 1. Both electrovalves are now closed to stop the feed A of compressed air and to make the blind-end tank 16 communicate with the tube issuing bubbles 3 by way of the tubing 17, 19, 20 in order to eliminate the capillary effect of the distilled water 2 in the tube issuing bubbles 3; the communication is now established between the container 14 and the jar 1 by way of tubing 13 and 21. At this point, should the container 14 to be tested present even the smallest loss towards the outside a fall in pressure in the left branch of the system would occur (jar 1, tubing 21, 13, container 14) with a consequent passage of air from the tank 18 into the left branch by way of tube 20 and the issuing tube 3 with bubbles forming at the end of tube 3 dipping into the water.

Corresponding impulses will be transmitted by the photocell 6 to the counting device 8 of the apparatus 7. The preregulating commutator 9 allows the required tolerance to be imposed during testing.

As already mentioned, this meter can also be used without the differential pressure system as a speedy indicator of microlosses. In this case tube 3 issuing bubbles is connected up below any gas interception device to be tested (tap, valve, etc.).

It is evident that many variations and alterations may be made by those skilled in the art to the details of construction of this meter without exceeding the scope of the invention.

What I claim is:

1. A photoelectric bubble meter for checking gastight containers and interception devices in general, comprising:

a. a transparent jar containing a liquid and having an inflow tube dipping below the surface of said liquid in the jar, and an outflow tube above the surface of said liquid;
   b. a projector placed at one side of said jar and outside it which is adapted to transmit a horizontal beam of light towards the lower end of said tube dipping into said liquid in said jar;
   c. a photocell positioned on the other side of said jar diametrically opposed to said projector and adapted to reveal the eventual bubbles originated by leaks in the tested container and issuing from said dipping tube;
   d. an impulse counting device adapted to count the impulses coming from said photocell following the emission of said bubbles from said tube dipping in said liquid, said dipping tube being connected to the container or interception device to be tested; and
   e. a differential pressure system, inserted between the container to be tested and said jar, and consisting of: a first electrovalve for the introduction of compressed air and connected by tubing on one side with the container to be tested and a second electrovalve, and on the other side with said outflow tube from said jar; and auxiliary storage tank connected on one side to said tube dipping into said liquid in said jar and on the other side to said second electrovalve; and a blind-end tank connected to said second electrovalve, said tank being adapted to eliminate the capillary effect of said tube dipping into said liquid in said jar.

2. A meter according to claim 1, wherein said impulse counting device is provided with a commutator adapted to be regulated at a predetermined tightness value tolerance during a test.